United States Patent
Zhu (10) Patent No.: US 11,807,274 B2
(45) Date of Patent: Nov. 7, 2023

(54) L4 AUTO-EMERGENCY LIGHT SYSTEM FOR FUTURE HARSH BRAKE

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 641 days.

(21) Appl. No.: 16/916,470

(22) Filed: Jun. 30, 2020

(65) Prior Publication Data
US 2021/0403043 A1   Dec. 30, 2021

(51) Int. Cl.
| B60W 60/00 | (2020.01) |
| B60W 30/09 | (2012.01) |
| B60W 30/095 | (2012.01) |
| B60W 30/18 | (2012.01) |
| B60Q 1/50 | (2006.01) |
| B60Q 1/44 | (2006.01) |

(52) U.S. Cl.
CPC .......... *B60W 60/0017* (2020.02); *B60Q 1/44* (2013.01); *B60Q 1/535* (2022.05); *B60W 30/09* (2013.01); *B60W 30/0953* (2013.01); *B60W 30/0956* (2013.01); *B60W 30/18109* (2013.01); *B60W 60/0016* (2020.02); *B60W 2552/53* (2020.02); *B60W 2554/80* (2020.02); *B60W 2554/802* (2020.02)

(58) Field of Classification Search
CPC .......... B60Q 1/44; B60Q 1/525; B60Q 1/535; B60W 30/09; B60W 30/0953; B60W 30/0956; B60W 30/18109; B60W 60/0015; B60W 60/0016; B60W 60/0017
See application file for complete search history.

(56) References Cited

U.S. PATENT DOCUMENTS

| H2001 H | * | 11/2001 | Pinkus | .......................... 340/463 |
| 6,424,256 B1 | * | 7/2002 | Ryder | ................... B60Q 1/445 340/478 |
| 2016/0139598 A1 | * | 5/2016 | Ichikawa | .............. B60W 30/09 701/25 |
| 2016/0214609 A1 | * | 7/2016 | Yamaoka | ................. B60Q 9/00 |
| 2018/0050673 A1 | * | 2/2018 | D'sa | ......................... B60T 8/58 |
| 2018/0326956 A1 | * | 11/2018 | Zhu | ........................... B60T 8/00 |

* cited by examiner

*Primary Examiner* — Anshul Sood
(74) *Attorney, Agent, or Firm* — WOMBLE BOND DICKINSON (US) LLP

(57) ABSTRACT

A planned trajectory is analyzed by an L4 emergency braking module, before the trajectory is navigated by the autonomous driving vehicle (ADV). An L4 emergency braking signal is generated in response to an autonomous driving vehicle (ADV) determining that any portion of a planned trajectory of the ADV has a deceleration that is less than −2 m/sec² and a time to collision with the ADV, by a vehicle following the ADV at a speed Z and a distance Y<100 m, during a period of 1 to 8 seconds after time 0 of the planned trajectory, if $$\frac{T_X + Y}{Z} \leq X$$

for any time $X \in \{1 \text{ second} \ldots 8 \text{ seconds}\}$ after time 0, wherein $T_X$ is the location of the ADV in the trajectory at time X. Optionally, a sharp braking command can be issued by the L4 emergency braking module in response to activating the emergency braking signal.

21 Claims, 8 Drawing Sheets

651 — Determining a planned trajectory, T, for an autonomous driving vehicle (ADV).

652 — Determining (1) whether any part of the planned trajectory, T, requires deceleration of less than -2 m/sec$^2$ for at least 0.5 seconds, and determining (2) whether, for at least one point $T_X$ in the trajectory, having speed $S_X$, the ADV has an average deceleration over the trajectory of $(S_X-S_0)/(T_X-T_0) \leq -2m/sec^2$.

653 — Determining (3) whether a vehicle is traveling at a distance Y < 100 meters behind the ADV at a speed Z, and (4) determining, for each of a future time, X = 1 second..8 seconds, the location $T_X$ of the ADV at time X, and determining that there will be a collision if $(T_X+Y)/Z \leq X$.

654 — In response to all of (1)..(4) of operations 652 and 653 being TRUE, activating the L4 emergency braking signal, and optionally, issuing a sharp braking command to a braking control of the ADV.

655 — Deactivating the emergency braking signal 8 seconds after any of (1)..(4) are FALSE.

FIG. 6B

L4 AUTO-EMERGENCY LIGHT SYSTEM FOR FUTURE HARSH BRAKE

TECHNICAL FIELD

Embodiments of the present disclosure relate generally to operating autonomous driving vehicles. More particularly, embodiments of the disclosure relate to navigating an autonomous driving vehicle (ADV) in an emergency braking scenario.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers. There are six recognized levels of automation of vehicles. Level L4 automation is a high level of automation wherein a vehicle is capable of completing a driving route without driver intervention. L4 emergency braking refers to an autonomous vehicle with level L4 automation performing emergency braking.

While navigating any vehicle, traffic situations can arise that require sharp braking of the vehicle, such as to avoid a collision. Notification to other drivers that a vehicle is going to make a sharp braking action is important to help other drivers adjust their driving to the sharp braking situation. Currently, notification of a sharp braking action occurs during the sharp braking action.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a computer-implemented method of activating an emergency braking signal in an autonomous driving vehicle (ADV). The emergency braking signal is activated during the planning phase of a portion of a route in response to determining that an emergency braking scenario will arise that requires a sharp braking action. As described herein, the ADV determines a route from a starting point to a destination ending point. Throughout navigation of the ADV, a portion of the route is a calculated for approximately 7 to 10 second segments of the route. Each segment is termed a trajectory.

As the trajectory is calculated, an emergency braking module determines whether the planned trajectory may require a sharp braking action to avoid a collision, before normal navigation would call for actuating the sharp braking action. Since the trajectory is calculated before using the trajectory for navigation, and the trajectory may be recalculated during navigation of the ADV, the emergency braking signal can be given at the earliest possible time to warn other vehicles that possible scenario is about to happen. Often times, the possible collision scenario is brought on by a car following the ADV not noticing, or not being unable to see, obstacles around the ADV that the ADV can detect. To warn the driver(s) and vehicle(s) behind the ADV to the upcoming possible collision scenario, the emergency braking signal can be given by the ADV as early as possible.

The trajectory, T, of the ADV can include a plurality of (location, speed) pairs $(T_X, S_X)$ at time increments, $X=0 \ldots n$ such that at a time X the ADV has a planned location $T_X$ having a planned speed of $S_X$. In response to determining that any part of the planned trajectory requires a deceleration less than a predetermined deceleration threshold, and determining that a predicted time to a collision with an obstacle is less than a predicted time threshold, the emergency braking signal can be activated for the ADV. In an embodiment, activating the emergency braking signal can be accompanied by a sharp braking command being asserted to the brake control system of the ADV control system, such as braking the maximum amount before the ADV begins to skid. The predetermined deceleration threshold can be −2 m/sec². In an embodiment, the predetermined deceleration threshold is −2 m/sec² for at least 0.5 seconds for any portion of the trajectory. For a vehicle following behind the ADV at a speed Z and a distance Y<100 meters, the predicted time to a collision can be X, in response to $$\frac{(T_X - Y)}{Z} \leq X.$$

The emergency braking signal can be a double-flashing of the tail lights of the ADV. In an embodiment, the ADV can have a brake light that is separate from the tail lights of the ADV. The emergency braking signal can be a double-flashing of the brake light. In embodiment, the emergency braking signal can include high-speed bursts of flashes of increasing speed in response to a vehicle behind the ADV failing to slow in response to the ADV emergency braking signal. In an embodiment, the emergency braking signal can be a standards-compliant signal, such as a country, state, or local standard for an emergency braking signal. In an embodiment, the emergency braking signal is configurable for a different country, state or locality.

In an embodiment, the emergency braking signal can automatically self-configure to a standard that applies with a location indicated by the ADV location services (e.g. GPS or cell tower triangulation). The emergency braking signal can be deactivated at a predetermined signal duration after deceleration (if any) is greater than the predetermined deceleration threshold or the predicted time to collision is greater than the predicted time to collision threshold. In an embodiment, the predetermined signal duration is 8 seconds. In an embodiment, the emergency braking signal can be deactivated 8 seconds after any condition, or combination of conditions, that caused the emergency braking signal to be activated is no longer true.

Figure 1:
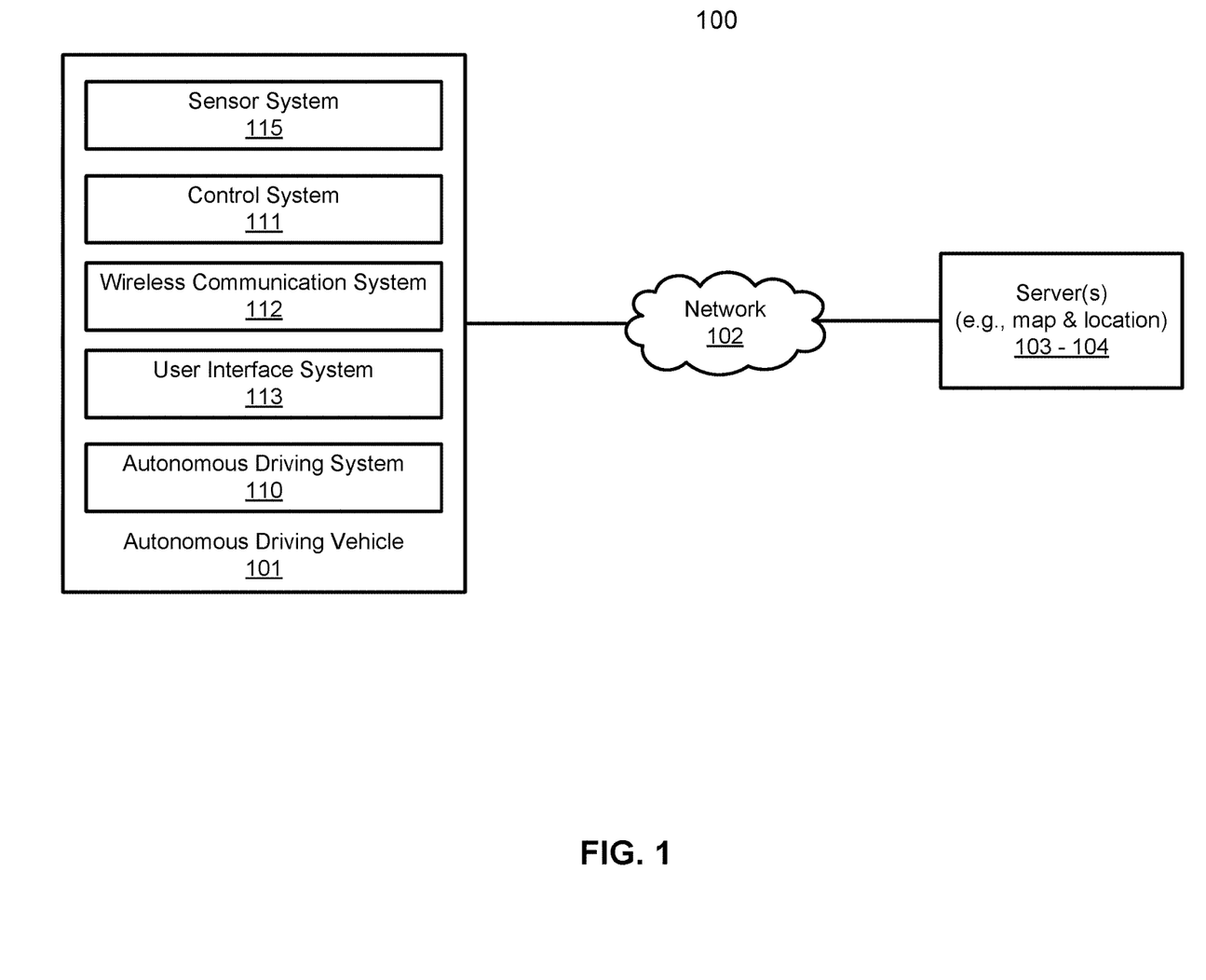
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
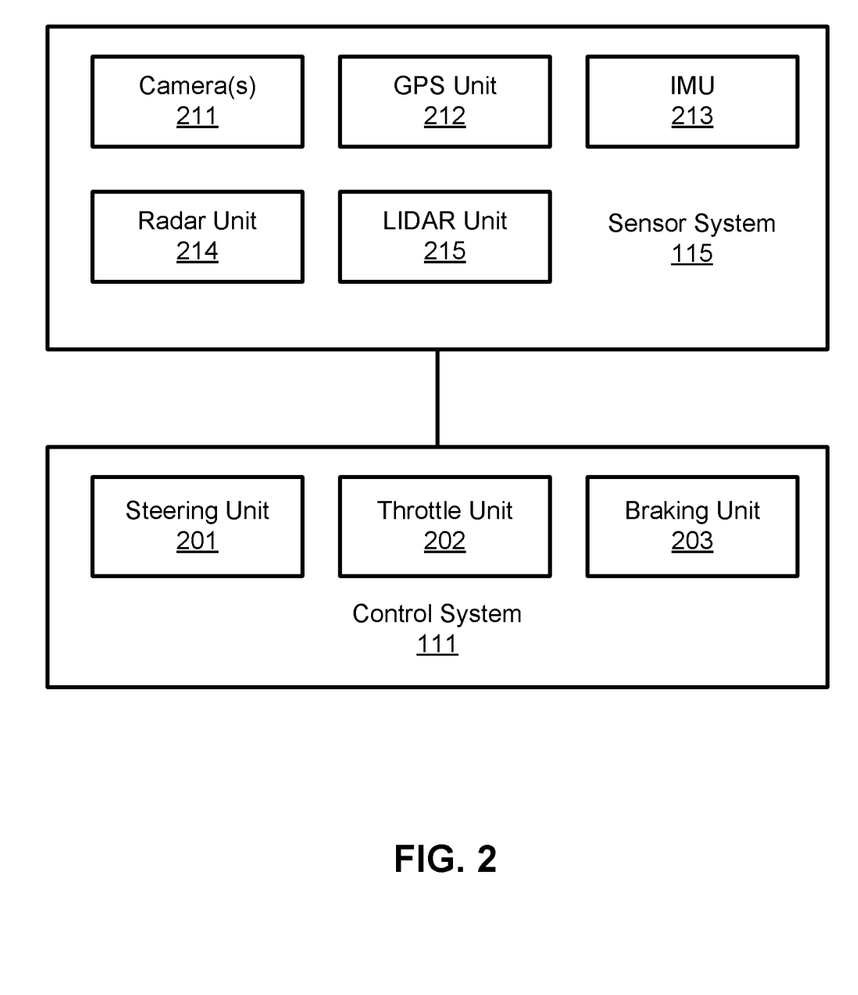
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV.

In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform. Sensor system 115 can detect a vehicle that is following behind the ADV, a distance that the vehicle is behind the ADV, and a speed that the vehicle is traveling.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. In some embodiments, an emergency braking signal actuation system may be communicatively coupled to the sensor system 115 and control system 111.

In an embodiment, in response to the emergency braking signal actuation system signaling that an emergency braking action is forthcoming, the emergency braking signal actuation system may also assert an emergency braking actuation command to the braking unit 203 via control system 111. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Figure 3A:
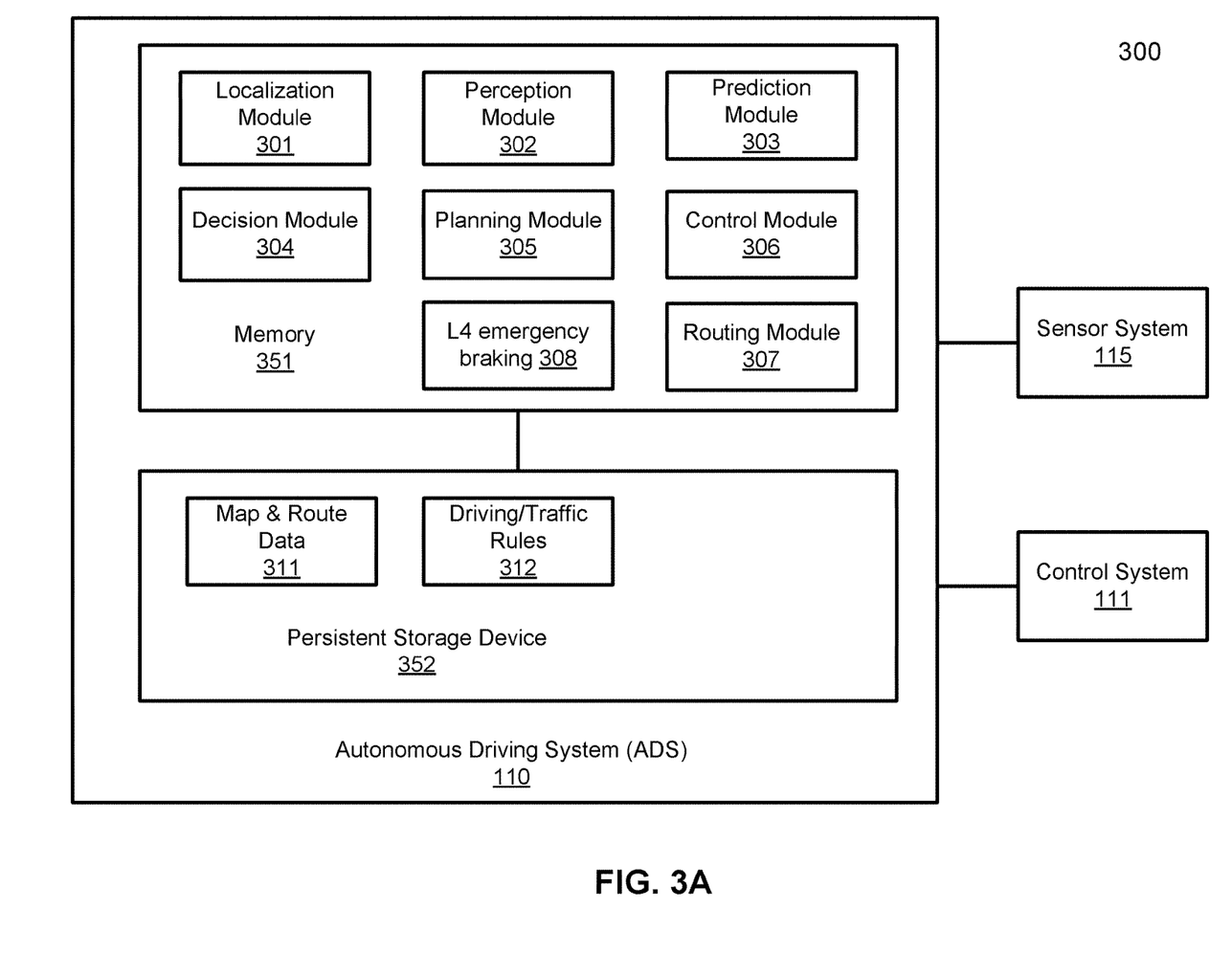
FIGS. 3A-3B are block diagrams illustrating an example of an autonomous driving system used with an autonomous driving vehicle according to one embodiment.
Figure 3B:
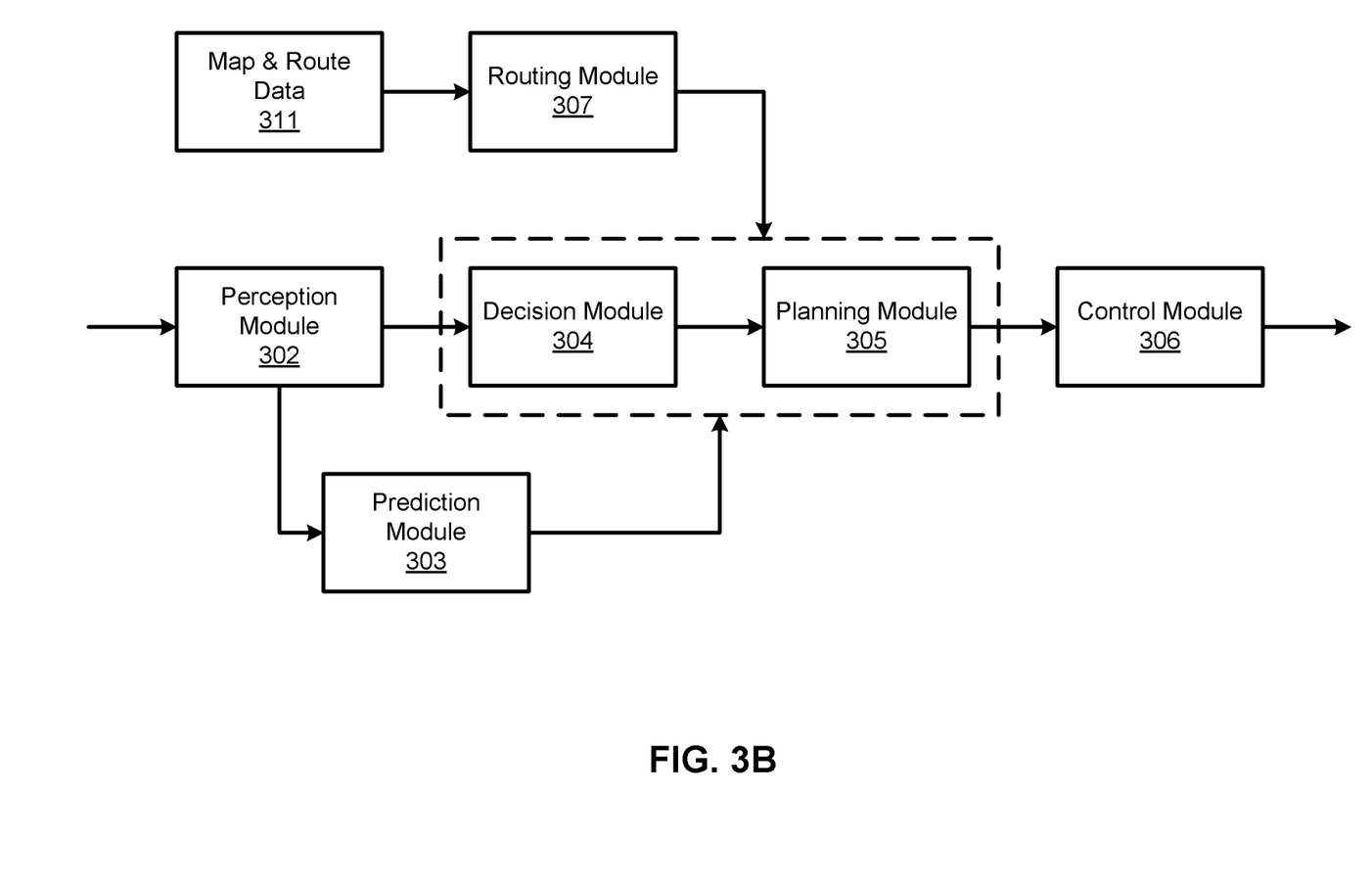

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and L4 emergency braking 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR. Perception module can detect the presence of a vehicle following the ADV in the same lane and direction, and can determine a distance that the vehicle is behind the ADV, and a speed that the vehicle is traveling.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to entering the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

L4 emergency braking module 308 determines whether a harsh braking emergency signal is needed to warn other vehicles of an upcoming emergency driving scenario. The L4 emergency braking module 308 works in conjunction with the planning module 305 and control module 306. When planning module 305 determines a trajectory for a plurality of points along a portion of a route that the ADV is to navigate, the L4 emergency braking module can analyze the trajectory in view of one or more obstacles, including whether a vehicle is following the ADV within 100 meters behind the ADV. A trajectory comprises a plurality of (location, speed) pairs $(T_X, S_X)$ at increments of time X=0 . . . n. The trajectory may represent a portion of the ADV this is about 7 to 10 seconds long. Increments may be 100 ms each, or other time increment. Thus, a trajectory $T=\{(T_0, S_0), (T_1, S_1) \ldots (T_X, S_X) \ldots (T_{n-1}, S_{n-1}), (T_a, S_n)\}$ for X=0 . . . n increments of time.

For any trajectory, T, the L4 emergency braking module can make at least the following four determinations:

(1) Whether there is any portion of the trajectory having a deceleration that is less than −2 m/sec² for a duration of at least 0.5 seconds.

(2) Whether there is any point $(T_X, S_X)$ in the trajectory such that $$\frac{(S_X - S_0)}{(T_X - T_0)} \leq -2 \text{ m/sec}^2.$$

(3) Whether there is a vehicle following the ADV in the same lane and direction as the ADV, the vehicle being a distance Y<100 meters behind the ADV and traveling at a speed Z.

(4) Whether the vehicle traveling behind the ADV may have a collision with the ADV in a time-to-collision TTC≤8 seconds. If the vehicle following the ADV keeps its current speed, Z, and the ADV follows its current planned trajectory, T, the vehicle will have a collision with the ADV if $$\frac{(T_X + Y)}{Z} \leq X,$$

for any time X∈{1 secs ... 8 secs}, wherein $T_X$ is the location of the ADV at time X.

If all four of the above determinations are true, then the L4 emergency braking module 308 activates an emergency braking signal. The emergency braking signal can be a double-flashing of the tail lights of the ADV. In an embodiment, the ADV can have a brake light that is separate from the tail lights of the ADV. The emergency braking signal can be a double-flashing of the brake light. In an embodiment, the emergency braking signal can include high-speed bursts of flashes of increasing speed in response to a vehicle behind the ADV failing to slow in response to the ADV emergency braking signal. In an embodiment, the emergency braking signal can be a standards-compliant signal, such as a country, state, or local standard for an emergency braking signal. In an embodiment, the emergency braking signal is configurable for a different country, state or locality.

In an embodiment, the emergency braking signal can automatically self-configure to a standard that applies with a location indicated by the ADV location services, such as GPS or cell tower triangulation. The emergency braking signal can be deactivated a predetermined signal duration after deceleration is greater than the predetermined deceleration threshold or the predicted time to collision is greater than the predicted time to collision threshold. In an embodiment, the predetermined signal duration is 8 seconds. In an embodiment, the emergency braking signal can be deactivated 8 seconds after any condition is no longer true, in a combination of conditions that caused activation of the emergency braking signal.

Figure 4:
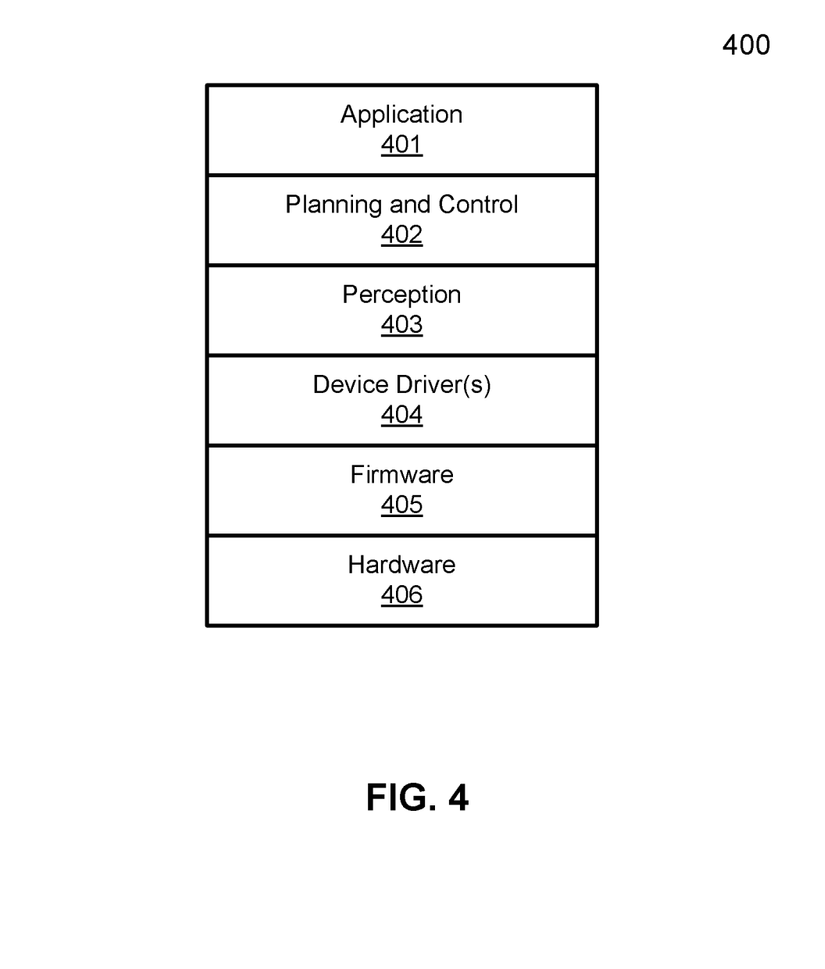
FIG. 4 is a block diagram illustrating architecture of an autonomous driving system according to one embodiment.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5A:
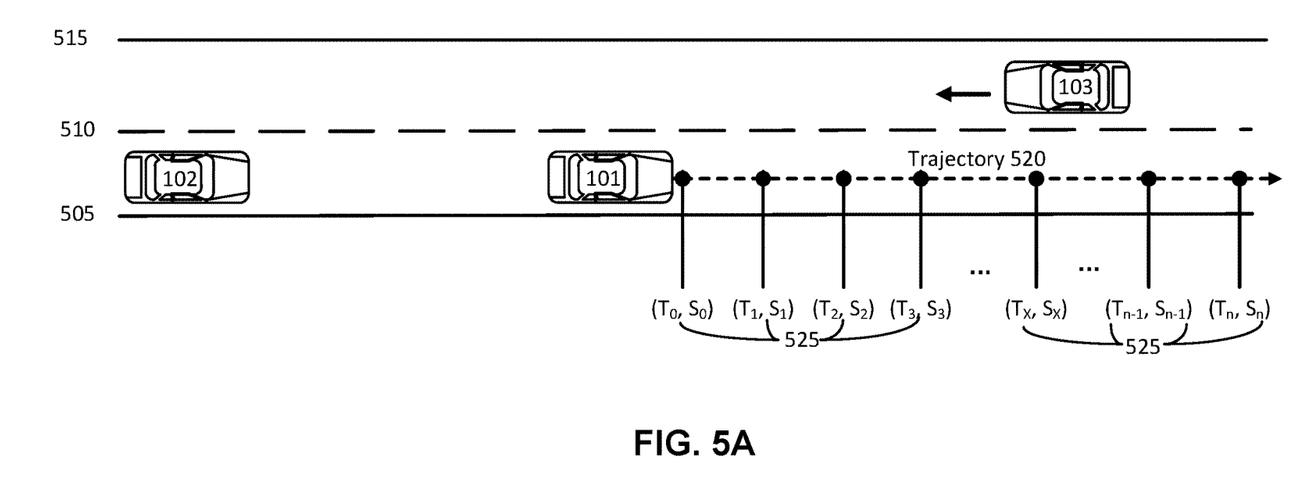
FIGS. 5A and 5B illustrate driving scenarios wherein an autonomous driving vehicle (ADV) determines whether the ADV will issue an emergency braking signal before issuing a harsh braking command, according to some embodiments.
Figure 5B:
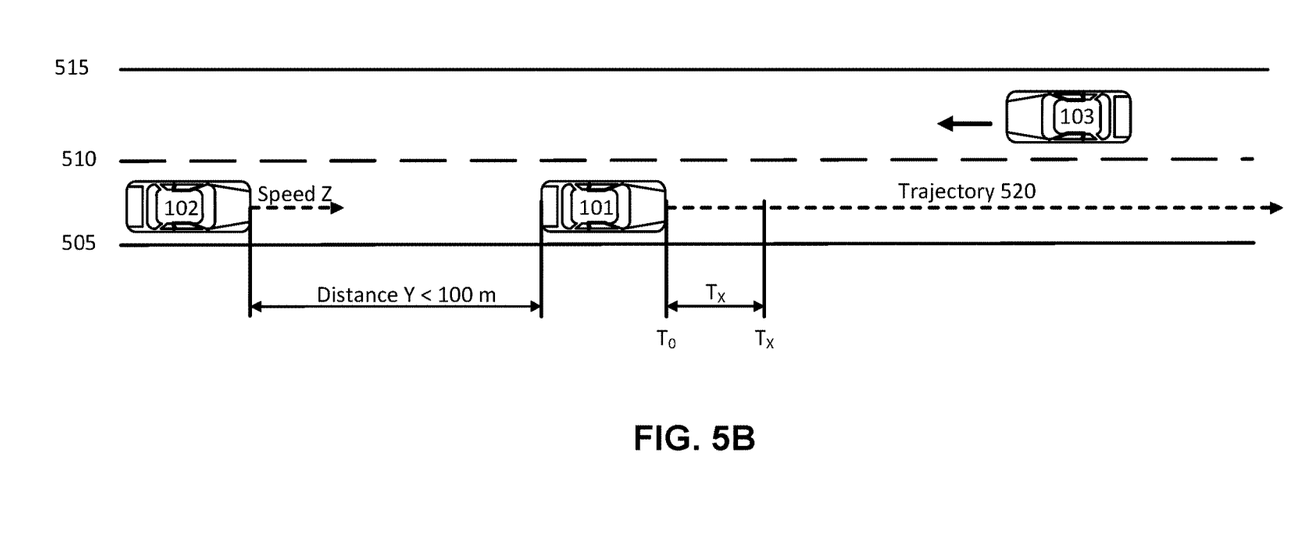

FIGS. 5A and 5B illustrate driving scenarios wherein an autonomous driving vehicle (ADV) determines whether the ADV will issue an emergency braking signal to notify other drivers of an upcoming emergency driving scenario. In an embodiment, the emergency braking signal can be accompanied by a sharp braking command. A sharp braking command can be any of: the most braking force that can be applied before the ADV will begin to lose traction and begin skidding, a braking command that is at least 50% of a maximum braking command magnitude, a braking command that is 100% more braking command magnitude than a current braking command magnitude of 25% or higher, or other emergency braking action. In an embodiment, the L4 emergency braking signal and optional emergency braking command can be issued by the L4 emergency braking module when the trajectory has been calculated by the planning module and before the ADV begins navigating with the planned trajectory. This gives an emergency braking signal indication, and optionally an emergency braking action, earlier than in the prior art.

Referring to FIG. 5A, a multi-lane roadway having first and second roadway boundaries, e.g. 505 and 515, which may be a curb, a shoulder, or a painted stripe or other indication of a lane boundary. In the example multi-lane roadway of FIG. 5A, a first lane has as direction of left-to-right, and the second lane is the opposing direction (right-to-left). The two opposing lanes may be separated by a boundary 510 which can be a painted stripe, a concrete median, or barrier, or other lane boundary. ADV 101 is being followed by vehicle 102. Vehicle 102 can be another ADV or a conventional human-driven car. Another vehicle 103 can be traveling the opposing direction to ADV 101 and vehicle 102, in the second lane.

ADV 101 follows a trajectory 520. The trajectory 520 is planned by a planning module, e.g. 305, and may be analyzed by the L4 emergency braking module, e.g. 308, before the planned route is selected for navigation by a routing module, e.g. routing module 307. Trajectory 520 can include a plurality of station points 525 that each comprise a location, $T_X$, and a speed, $S_X$, for X=0 ... n station points. With respect to trajectory 520 and ADV 101, at a time increment 0, ADV 101 is planned to be at location $T_0$ and having speed $S_0$, ending with a location $T_n$ and speed $S_n$ at time n. Thus a trajectory, T, is: T={$(T_0, S_0), (T_1,S_1) ... (T_X, S_X) ... (T_{n-1},S_{n-1}), (T_n, S_n)$} for X=0 ... n time increments. A time increment can be, e.g. 100 ms (10 Hz). L4 emergency braking module, e.g. 308, can determine whether the ADV 101 is planned to decelerate faster than a threshold amount. In an embodiment, L4 emergency braking module 308 can determine whether any part of the trajectory, T, will require a deceleration of faster than a predetermined threshold, by checking whether there are any two points $(T_X, S_X)$ and $(T_y, S_y) \in T$ such that $$\frac{(S_Y - S_X)}{(T_Y - T_X)} \le -2 \text{ m/sec}^2.$$

In an embodiment, the two points may be chosen to encompass a specific time span, such as 500 ms (5 samples, at 10 Hz). L4 emergency braking module 308 can also determine whether an average deceleration is faster than a predetermined threshold. For example, with respect to a first point $(T_0, S_0) \in T$, L4 emergency braking module 308 can determine whether the average deceleration for any second point $(T_X, S_X) \in T$ is less than the predetermined threshold such that:

$$\frac{(S_X - S_0)}{(T_X - T_0)} < -2 \text{ m/sec}^2$$

for a duration of at least 0.5 seconds.

Referring now to FIG. 5B, L4 emergency braking module 304 can determine whether a vehicle 102 that is following ADV 101 may cause a collision such that ADV 101 issue the L4 emergency braking indication to the vehicle 102 that is following the ADV 101, and optionally, whether the ADV should issue a sharp braking command. The multi-lane roadway lane boundaries 505, 510, and 515 can be the same as described above with reference to FIG. 5A. A perception module, e.g., perception module 302, can detect the presence of vehicle 102 in the same lane as the ADV 101, located behind ADV 101.

Perception module can also determine a speed Z that vehicle 102 is traveling and a distance Y that vehicle 102 is traveling behind ADV 101. If vehicle 102 is at a threshold distance behind ADV 101, such as Y<100 meters (m) behind ADV 101, then L4 emergency braking module 308 can further determine whether a collision may occur with 8 seconds if vehicle 102 continues traveling at speed Z and ADV 101 follows its planned trajectory, T. For example, if the location of ADV 101 is currently at location $T_0$ at time 0, and ADV 101 will be at a distance X at 3 seconds in the future, then there will be a collision if $$\frac{(X+Y)}{Z} \leq 3 \text{ secs.}$$

L4 emergency braking module 308 can check the trajectory T from, e.g., 1 to 8 seconds in the future to determine whether any point in the trajectory T during the 1 to 8 seconds in the future indicates a collision.

Combining the examples in FIGS. 5A and 5B: if (1) any part of the trajectory T has a deceleration that is faster deceleration than −2 m/sec² for at least 0.5 seconds, and (2) if there is any point ($T_X$, $S_X$) in the trajectory that has an average deceleration such that $$\frac{(S_X - S_0)}{(T_X - T_0)} < -\frac{2 \text{ m}}{\text{sec}^2},$$

and (3) it mere is a vehicle 102 traveling at a speed Z following ADV 101 at a distance Y<100 m behind the ADV 101, and (4) there is any point ($T_X$, $S_X$) in trajectory T with $T_X$ at a distance X from ADV 101 from 1 to 8 seconds in the future (measured from time 0 of the trajectory) such that $$\frac{(X+Y)}{Z} \leq X \text{ secs}$$

then L4 emergency braking module instructs control module 306 to issue the L4 emergency braking signal. The emergency braking signal is maintained for a duration of 8 seconds after any of the conditions (1) . . . (4), above, have cleared and are no longer true. In an embodiment, the L4 emergency braking signal can be issued with fewer than all four conditions, above. In an embodiment, the L4 emergency braking signal can be accompanied by a sharp braking command.

Figure 6A:
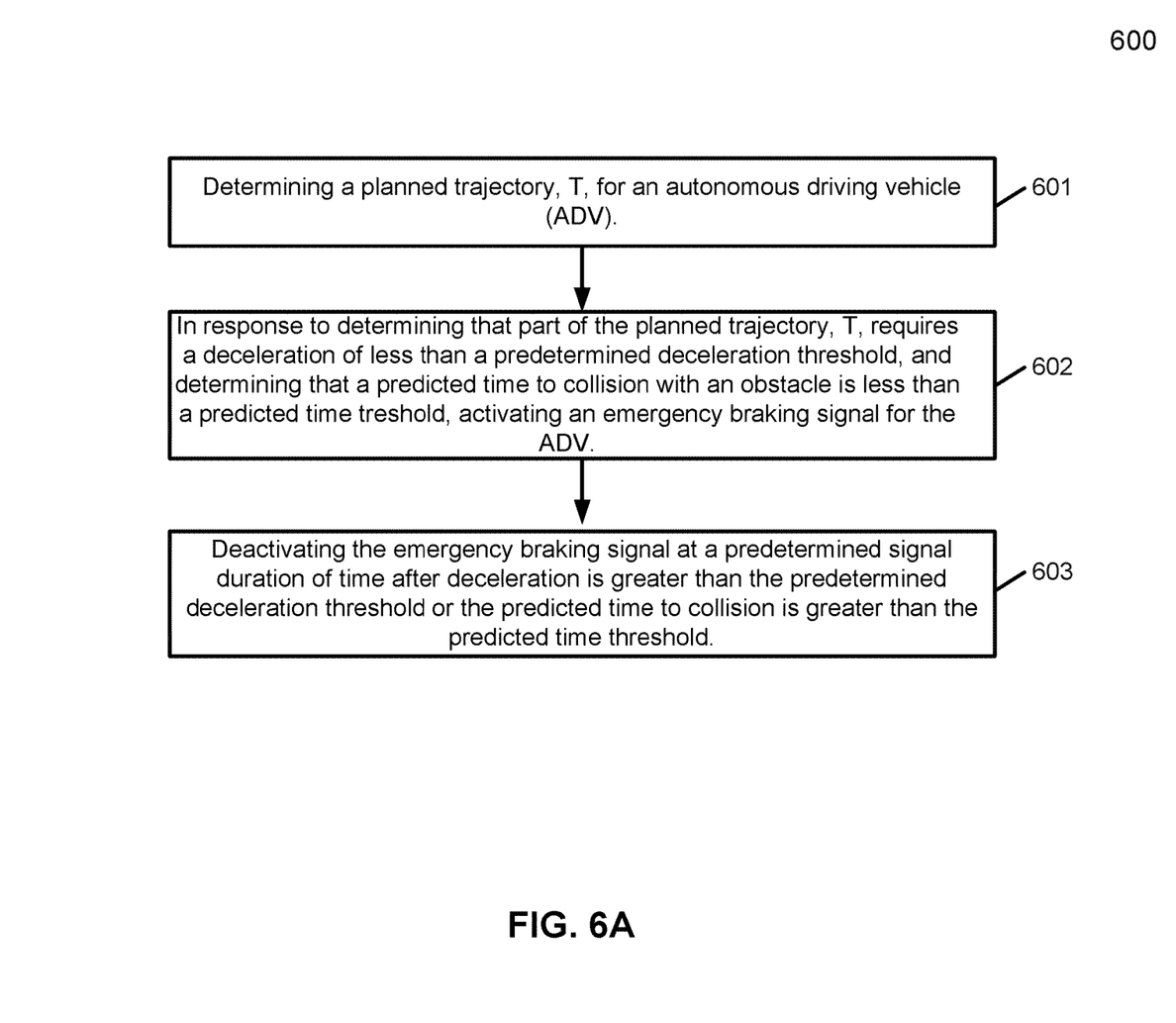
FIGS. 6A and 6B are methods of an ADV determining whether the ADV will issue an emergency braking signal before issuing a harsh braking command, according to some embodiments.
Figure 6B:
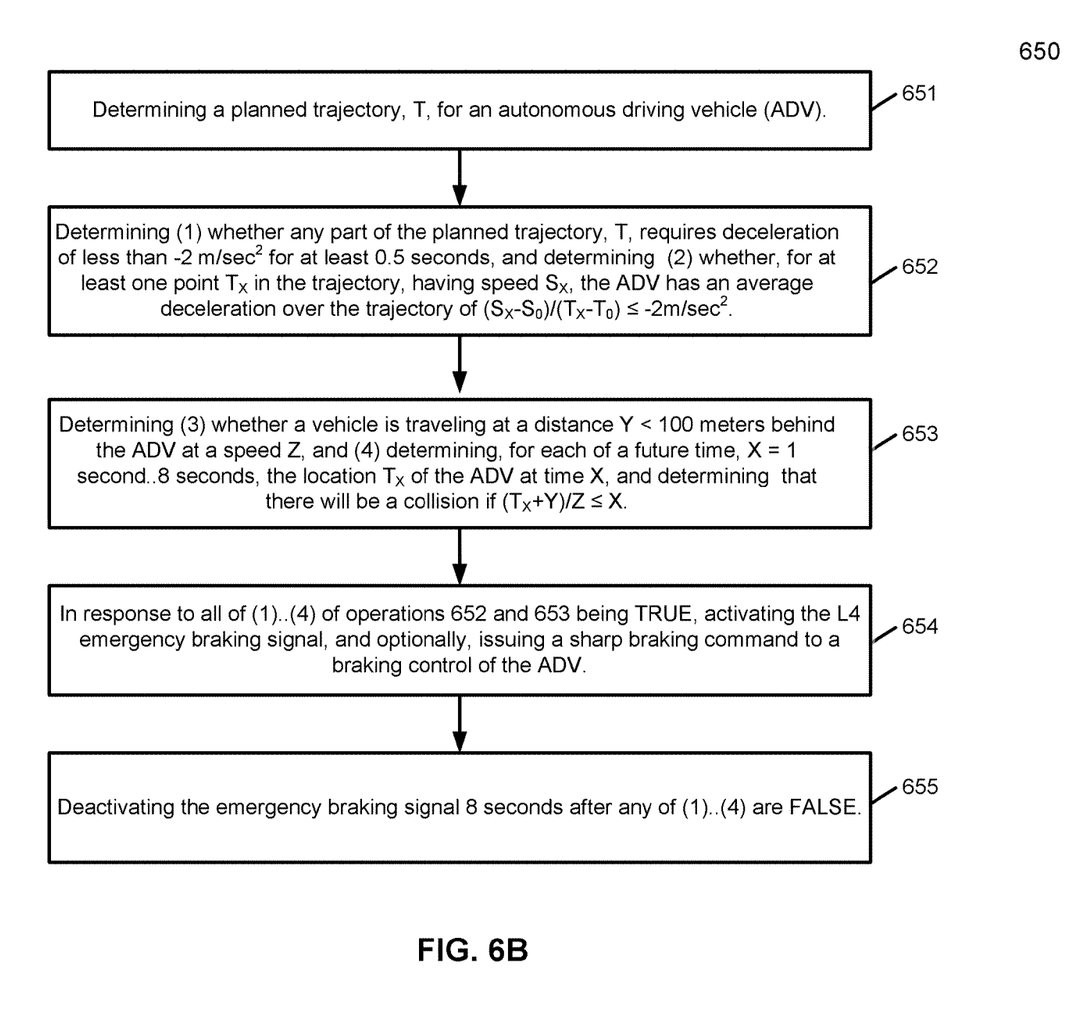

FIGS. 6A and 6B illustrate methods 600 and 650, respectively, of issuing an L4 emergency braking signal in accordance with information obtained from a perception and planning module of the ADV.

Referring to FIG. 6A, in operation 601, a planning module, e.g. planning module 305, determines a trajectory, T, for an autonomous driving vehicle (ADV). The trajectory can be a path, or portion, of a larger route between an originating point and a terminating point. A trajectory may, for example, be approximately 7 to 10 seconds in length, and may be updated regularly.

In operation 602, an emergency L4 emergency braking signal can be issued in response to determining that any part of the trajectory requires deceleration faster than a predetermined threshold, and that a predicted time to a collision is less than a predicted time threshold. In an embodiment, the L4 emergency braking signal is generated in response to the deceleration being less than −2 m/sec² and the time to collision being less than 8 seconds. In an embodiment, a sharp braking command can be issued to the braking control system at substantially the same time as the issuing of the L4 emergency braking signal.

In operation 603, a predetermined amount of time after the deceleration is slower than the predetermined threshold or the predicted time collision is greater than the predicted time threshold, the L4 emergency braking signal can be deactivated. In an embodiment, 8 seconds after the deceleration is slower than −2 m/sec² or the predicted time to collision is greater than 8 seconds, then the L4 emergency braking signal can be deactivated. In an embodiment, if a sharp brake command was issued to a braking control in conjunction with the L4 emergency braking signal, then the sharp brake command can be reduced, and/or braking control can be turned over to the control system actuation via normal control system logic.

Referring now to FIG. 6B, method 650, in operation 651, a planning module, e.g. planning module 305, determines a trajectory, T, for an autonomous driving vehicle (ADV). The trajectory can be a path, or portion, of a larger route between an originating point and a terminating point. A trajectory may, for example, be approximately 7 to 10 seconds in length, and may be updated regularly.

In operation 652, it can be determined (1) whether part of the planned trajectory, T, requires deceleration faster than −2 m/sec² for at least 0.5 seconds. It can further be determined (2) whether, for at least one point in the trajectory having location $T_X$ and planned speed $S_X$ the average deceleration over the trajectory (with reference to a starting point $T_0$ and planned speed $S_0$) has a deceleration $$\frac{(S_X - S_0)}{(T_X - T_0)} \leq -2 \text{ m/sec}^2.$$

In operation 653, it can be determined (3) whether there is a vehicle behind the ADV traveling at a speed Z and a distance Y<100 meters (m) behind the ADV. It can further be determined (4) whether, for each of a future time, t=1 . . . 8 seconds, the location X of the ADV at a time t satisfies $$\frac{(X+Y)}{Z} \leq t.$$

In operation 654, in response to all of (1) . . . (4), above, being TRUE, then the L4 emergency braking signal can be activated. The L4 emergency braking signal can be a double-flashing of the tail lights of the ADV, or other special flashing pattern, brightness, or other indicator of the L4 emergency braking condition. In an embodiment, the L4 emergency braking signal complies with a country-specific, state-specific, or local standard. Optionally, a sharp braking command can be issued to the brake control of the ADV control system. In an embodiment, a sharp braking command is maximum braking signal that can be input to the braking control without causing the ADV tires to skid on the roadway. In an embodiment, the sharp braking control is 25% greater than the current braking control input (if any).

In operation 655, in response to determining that at least one of tests (1) . . . (4) are no longer TRUE, for a duration of at least 8 seconds, the L4 emergency braking signal can be deactivated. In an embodiment, if a sharp braking command was issued to the braking control responsive to the L4 emergency braking signal, the sharp braking command can be rescinded, and/or the braking control input can be controlled by the routing module, e.g. module 307. Method 650 ends.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of activating an emergency braking signal in an autonomous driving vehicle (ADV), comprising:
- determining that any part of a planned trajectory of the ADV meets a first condition, wherein the first condition requires a deceleration that is less than a predetermined deceleration threshold and lasts for at least a predetermined duration;
- determining that a predicted time to a collision with an obstacle following the ADV meets a second condition, wherein the second condition requires that the predicted time to the collision is less than a predicted time threshold;
- activating the emergency braking signal for the ADV, in response to determining that both the first condition and the second condition are met; and
- deactivating the emergency braking signal a predetermined signal duration after at least one of the first condition or the second condition is not being met.

2. The method of claim 1, further comprising generating a signal to a brake control system to actuate the brake control system of the ADV.

3. The method of claim 1, wherein the predetermined deceleration threshold is −2 m/sec², and the predetermined duration 0.5 seconds.

4. The method of claim 1, wherein the planned trajectory for the ADV comprises a plurality of (location, speed) pairs $(T_X, S_X)$ at time increments X=0 . . . n, such that at time X the ADV is at a location $T_X$ having a planned speed of $S_X$, and the emergency braking signal is activated for the ADV in response to $$\frac{(S_X - S_0)}{(T_X - T_0)} \leq -2 \text{ m/sec}^2$$

for any $T_X$ in the trajectory with time increment X>0.

5. The method of claim 1, wherein the obstacle is a vehicle that is at distance Y behind the ADV, navigating in the same lane and direction as the ADV, and navigating at a speed Z, wherein Y<100 meters (m) and the predicted time threshold is 8 seconds.

6. The method of claim 5, wherein for X∈{1 second ... 8 seconds}, the ADV is at a location $T_X$ in the planned trajectory at time X, and the predicted time to the collision is X if $$\frac{(T_X + Y)}{Z} \le X.$$

7. The method of claim 1, wherein the predetermined signal duration is 8 seconds.

8. A non-transitory machine-readable medium having instructions stored therein, which when executed by a processor of an autonomous driving vehicle (ADV), cause the ADV to perform operations for activating an emergency braking signal of the ADV, the operations comprising:
  determining that any part of a planned trajectory of the ADV meets a first condition, wherein the first condition requires a deceleration that is less than a predetermined deceleration threshold and lasts for at least a predetermined duration;
  determining that a predicted time to a collision with an obstacle following the ADV meets a second condition, wherein the second condition requires that the predicted time to the collision is less than a predicted time threshold;
  activating the emergency braking signal for the ADV, in response to determining that both the first condition and the second condition are met; and
  deactivating the emergency braking signal a predetermined signal duration after at least one of the first condition or the second condition is not being met.

9. The medium of claim 8, wherein the operations further comprise generating a signal to a brake control system to actuate the brake control system of the ADV.

10. The medium of claim 8, wherein the predetermined deceleration threshold is −2 m/sec², and the predetermined duration is 0.5 seconds.

11. The medium of claim 8, wherein the planned trajectory for the ADV comprises a plurality of (location, speed) pairs $(T_X, S_X)$ at time increments X=0 ... n, such that at time X the ADV is at a location $T_X$ having a planned speed of $S_X$, and the emergency braking signal is activated for the ADV in response to $$\frac{(S_X - S_0)}{(T_X - T_0)} \le -2 \text{ m/sec}^2.$$

for any $T_X$ in the trajectory with time increment X>0.

12. The medium of claim 8, wherein the obstacle is a vehicle that is at distance Y behind the ADV, navigating in the same lane and direction as the ADV, and navigating at a speed Z, wherein Y<100 meters (m) and the predicted time threshold is 8 seconds.

13. The medium of claim 12, wherein for X∈{1 second ... 8 seconds}, the ADV is at a location $T_X$ in the planned trajectory at time X, and the predicted time to the collision is X if $$\frac{(T_X + Y)}{Z} \le X.$$

14. The medium of claim 8, wherein the predetermined signal duration is 8 seconds.

15. A data processing system, comprising:
  a processor; and
  a memory coupled to the processor to store instructions, which when executed by the processor, cause the processor to perform operations for activating an emergency braking signal of an autonomous driving vehicle (ADV), the operations including
    determining that any part of a planned trajectory of the ADV meets a first condition, wherein the first condition requires a deceleration that is less than a predetermined deceleration threshold and lasts for at least a predetermined duration,
    determining that a predicted time to a collision with an obstacle following the ADV meets a second condition, wherein the second condition requires that the predicted time to the collision is less than a predicted time threshold,
    activating the emergency braking signal for the ADV, in response to determining that both the first condition and the second condition are met, and
    deactivating the emergency braking signal a predetermined signal duration after at least one of the first condition or the second condition is not being met.

16. The system of claim 15, wherein the operations further comprise generating a signal to a brake control system to actuate the brake control system of the ADV.

17. The system of claim 15, wherein the predetermined deceleration threshold is −2 m/sec², and the predetermined duration is 0.5 seconds.

18. The system of claim 15, wherein the planned trajectory for the ADV comprises a plurality of (location, speed) pairs $(T_X, S_X)$ at time increments X=0 ... n, such that at time X the ADV is at a location $T_X$ having a planned speed of $S_X$, and the emergency braking signal is activated for the ADV in response to $$\frac{(S_X - S_0)}{(T_X - T_0)} \le -2 \text{ m/sec}^2.$$

for any $T_X$ in the trajectory with time increment X>0.

19. The system of claim 15, wherein the obstacle is a vehicle that is at distance Y behind the ADV, navigating in the same lane and direction as the ADV, and navigating at a speed Z, wherein Y<100 meters (m) and the predicted time threshold is 8 seconds.

20. The system of claim 19, wherein for X∈{1 second ... 8 seconds}, the ADV is at a location $T_X$ in the planned trajectory at time X, and the predicted time to the collision is X if $$\frac{(T_X + Y)}{Z} \le X.$$

21. The system of claim 15, wherein the predetermined signal duration is 8 seconds after any condition that caused the activation of the emergency braking signal has ended.

* * * * *